United States Patent
Li

(10) Patent No.: US 12,177,869 B2
(45) Date of Patent: Dec. 24, 2024

(54) SCRAMBLING AND DESCRAMBLING METHODS AND APPARATUSES

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 574 days.

(21) Appl. No.: 17/594,305

(22) PCT Filed: Apr. 12, 2019

(86) PCT No.: PCT/CN2019/082461
§ 371 (c)(1),
(2) Date: Oct. 10, 2021

(87) PCT Pub. No.: WO2020/206682
PCT Pub. Date: Oct. 15, 2020

(65) Prior Publication Data
US 2022/0167308 A1     May 26, 2022

(51) Int. Cl.
H04W 4/00      (2018.01)
H04W 72/044    (2023.01)
H04W 72/20     (2023.01)
H04W 72/30     (2023.01)
H04W 4/06      (2009.01)

(52) U.S. Cl.
CPC ....... *H04W 72/30* (2023.01); *H04W 72/0466* (2013.01); *H04W 72/20* (2023.01); *H04W 4/06* (2013.01)

(58) Field of Classification Search
None
See application file for complete search history.

(56) References Cited

U.S. PATENT DOCUMENTS

| | | |
|---|---|---|
| 2012/0207145 A1 | 8/2012 | Han et al. |
| 2018/0367238 A1 | 12/2018 | Gong et al. |
| 2019/0044669 A1 | 2/2019 | Davydov et al. |
| 2021/0297830 A1* | 9/2021 | Osawa ............... H04W 4/40 |

FOREIGN PATENT DOCUMENTS

| | | |
|---|---|---|
| CN | 104038920 A | 9/2014 |
| CN | 104619008 A | 5/2015 |
| CN | 104812057 A | 7/2015 |
| CN | 105376770 A | 3/2016 |

(Continued)

OTHER PUBLICATIONS

3GPP TSG RAN WG1 Meeting #76, R1-140777, 2014.*

(Continued)

*Primary Examiner* — Abdelillah Elmejjarmi
(74) *Attorney, Agent, or Firm* — Syncoda LLC; Feng Ma

(57) ABSTRACT

A scrambling method includes: determining a first scrambling sequence and a second scrambling sequence respectively; scrambling control information included in a control channel by using the first scrambling sequence, and scrambling, by using the second scrambling sequence, service data to be transmitted by a service channel; and sending the scrambled control information and the scrambled service data to a receiver through the sidelink respectively.

12 Claims, 5 Drawing Sheets

(56) References Cited

FOREIGN PATENT DOCUMENTS

| CN | 106559733 A | 4/2017 |
|---|---|---|
| CN | 107154833 A | 9/2017 |
| CN | 108307535 A | 7/2018 |
| EP | 2676504 A1 | 12/2013 |
| EP | 3079294 A1 | 10/2016 |
| WO | 2012110830 A1 | 8/2012 |
| WO | 2015109461 A1 | 7/2015 |

OTHER PUBLICATIONS

State Intellectual Property Office of the People's Republic of China, Office Action and Search Report Issued in Application No. 201980000627.8, Oct. 9, 2021, 15 pages.

ISA State Intellectual Property Office of the People's Republic of China, Written Opinion of the International Searching Authority Issued in Application No. PCT/CN2019/082461,Jun. 13, 2019, WIPO, 9 pages.

CATT, "Channel scrambling and DMRS design for D2D communication", 3GPP TSG RAN WG1 Meeting #76bis, R1-141191, Shenzhen, China, Mar. 31-Apr. 4, 2014, 2 pages.

Intellectual property India, Office Action Issued in Application No. 202147050792, Apr. 12, 2022, 5 pages.

ISA State Intellectual Property Office of the People's Republic of China, International Search Report Issued in Application No. PCT/CN2019/082461, Jun. 13, 2019, WIPO, 4 pages.

European Patent Office, Extended European Search Report Issued in Application No. 19924215.7, Sep. 30, 2022, Germany, 26 pages.

Ericsson, "On Scrambling of D2D Physical Channels", 3GPP TSG RAN WG1 Meeting #76, R1-140777, Prague, CZ Rep., Feb. 10-14, 2014, 5 pages.

CAICT, "Considerations on Scrambling Issue for NR V2X Unicast Sidelink", 3GPP TSG RAN WG1 Meeting #96, R1-1902923, Athens, Greece, Feb. 25-Mar. 1, 2019, 5 pages.

NTT Docomo, Inc. "Support of unicast, groupcast and broadcast", 3GPP TSG RAN WG1 Meeting #94, R1-1809156, Gothenburg, Sweden, Aug. 20-24, 2018, 5 pages.

Intellectual property India, Hearing Notice in Reference of Application No. 202147050792, Jun. 28, 2024, 3 pages.

* cited by examiner

SCRAMBLING AND DESCRAMBLING METHODS AND APPARATUSES

CROSS-REFERENCE TO RELATED APPLICATION

This application is a U.S. national stage of International Application No. PCT/CN2019/082461 filed on Apr. 12, 2019, the disclosure of which is hereby incorporated by reference in its entirety.

TECHNICAL FIELD

The present disclosure relates to the field of communication, and in particular to scrambling and descrambling methods and apparatuses.

BACKGROUND

Vehicle to Everything (V2X) is a new generation information communication technology for connecting a vehicle with all things, where V represents a vehicle and X represents any object interacting information with the vehicle, which mainly includes a vehicle, a person, a road-side traffic infrastructure and a network. Cellular (C)-V2X is a V2X technology evolved based on a cellular network communication technology such as a 4th generation mobile communication technology (4G) and a 5th generation mobile communication technology (5G).

Standardization of the C-V2X may include three stages: Long Term Evolution (LTE)-V2X, an enhanced technical research stage supporting V2X advanced service scenario (LTE-eV2X) and New Radio (NR)-V2X.

At present, there is no channel scrambling method for sidelink transmission of NR-V2X.

SUMMARY

In order to overcome the existing problems in the prior art, embodiments of the present disclosure provide scrambling and descrambling methods and apparatuses.

According to a first aspect of embodiments of the present disclosure, a scrambling method is provided. The method is applied to a sender of a sidelink and includes:

determining a first scrambling sequence and a second scrambling sequence respectively;

scrambling control information included in a control channel by using the first scrambling sequence, and scrambling, by using the second scrambling sequence, service data to be transmitted by a service channel; and sending the scrambled control information and the scrambled service data to a receiver through the sidelink respectively.

In some examples, determining the first scrambling sequence and the second scrambling sequence respectively includes:

determining the first scrambling sequence based on a first identifier, and determining the second scrambling sequence based on a second identifier.

In some examples, if there are a plurality of receivers, all of which are in the same multicast group, the first identifier is at least one of a multicast identifier corresponding to the multicast group or a sender identifier, and the second identifier is at least one of the multicast identifier or the sender identifier.

In some examples, if there is one or more receivers, all of which are not in the same multicast group, the first identifier is a preset value or a sender identifier, and the second identifier is the sender identifier.

In some examples, scrambling the control information included in the control channel by using the first scrambling sequence includes:

scrambling target control information by using the first scrambling sequence, where the target control information is the control information only to be sent to the receiver.

According to a second aspect of embodiments of the present disclosure, a descrambling method is provided. The method is applied to a receiver of a sidelink and includes:

receiving scrambled control information and scrambled service data respectively sent by a sender through the sidelink;

determining a first scrambling sequence and a second scrambling sequence respectively; and obtaining control information by descrambling the scrambled control information based on the first scrambling sequence and obtaining service data by descrambling the scrambled service data based on the second scrambling sequence.

In some examples, determining the first scrambling sequence and the second scrambling sequence respectively includes:

receiving a first identifier and a second identifier from the sender; and determining the first scrambling sequence based on the first identifier and determining the second scrambling sequence based on the second identifier.

According to a third aspect of embodiments of the present disclosure, a scrambling apparatus is provided. The apparatus is applied to a sender of a sidelink, and includes:

a first determining module, configured to determine a first scrambling sequence and a second scrambling sequence respectively;

a scrambling module, configured to scramble control information included in a control channel by using the first scrambling sequence and scramble, by using the second scrambling sequence, service data to be transmitted by a service channel; and a first sending module, configured to send the scrambled control information and the scrambled service data to a receiver through the sidelink respectively.

In some examples, the first determining module includes:

a first determining sub-module, configured to determine the first scrambling sequence based on a first identifier and determine the second scrambling sequence based on a second identifier.

In some examples, if there are a plurality of receivers, all of which are in the same multicast group, the first identifier is at least one of a multicast identifier corresponding to the multicast group or a sender identifier, and the second identifier is at least one of the multicast identifier or the sender identifier.

In some examples, if there are one or more receivers, all of which are not in the same multicast group, the first identifier is a preset value or the sender identifier, and the second identifier is the sender identifier.

In some examples, the scrambling module includes:

a scrambling sub-module, configured to scramble target control information by using the first scrambling sequence, where the target control information is the control information only to be sent to the receiver.

According to a fourth aspect of embodiments of the present disclosure, a descrambling apparatus is provided. The apparatus is applied to a receiver of a sidelink and includes:

a receiving module, configured to receive scrambled control information and scrambled service data respectively sent by a sender through the sidelink;

a second determining module, configured to determine a first scrambling sequence and a second scrambling sequence respectively; and a descrambling module, configured to obtain control information by descrambling the scrambled control information based on the first scrambling sequence, and obtain service data by descrambling the scrambled service data based on the second scrambling sequence.

In some examples, the second determining module includes:

a receiving sub-module, configured to receive a first identifier and a second identifier from the sender; and a second determining sub-module, configured to determine the first scrambling sequence based on the first identifier and determine the second scrambling sequence based on the second identifier.

According to a fifth aspect of embodiments of the present disclosure, a computer readable storage medium is provided. The storage medium stores computer programs which are used to perform the scrambling method according to the first aspect.

According to a sixth aspect of embodiments of the present disclosure, a computer readable storage medium is provided. The storage medium stores computer programs which are used to perform the descrambling method according to the above second aspect.

According to a seventh aspect of embodiments of the present disclosure, a scrambling apparatus is provided. The apparatus is applied to a sender of a sidelink and includes:

a processor; and a memory for storing instructions executable by the processor;

where the processor is configured to:

determine a first scrambling sequence and a second scrambling sequence respectively;

scramble control information included in a control channel by using the first scrambling sequence, and scramble, by using the second scrambling sequence, service data to be transmitted by a service channel; and send the scrambled control information and the scrambled service data to a receiver through the sidelink respectively.

According to an eighth aspect of embodiments of the present disclosure, a descrambling apparatus is provided. The apparatus is applied to a receiver of a sidelink, and includes:

a processor; and a memory for storing instructions executable by the processor;

where the processor is configured to:

receive scrambled control information and scrambled service data respectively sent by a sender through the sidelink;

determine a first scrambling sequence and a second scrambling sequence respectively; and obtain control information by descrambling the scrambled control information based on the first scrambling sequence, and obtain service data by descrambling the scrambled service data based on the second scrambling sequence.

The technical solutions according to the embodiments of the present disclosure have the following beneficial effects.

In the embodiments of the present disclosure, the sender of the sidelink may scramble the control information included in the control channel by using the first scrambling sequence and scramble, by using the second scrambling sequence, the service data to be transmitted by the service channel respectively, and then send the scrambled control information and the scrambled service data to the receiver through the sidelink. In the embodiments of the present disclosure, the control information and the service data sent by the sender can be scrambled in the sidelink, thereby improving the transmission performance of the sidelink.

In the embodiments of the present disclosure, the first scrambling sequence and the second scrambling sequence may be generated correspondingly based on the first identifier and the second identifier, bringing good convenience and high availability.

In the embodiments of the present disclosure, the sender may scramble only the target control information by using the first scrambling sequence, where the target control information is control information only to be sent to the current receiver. Other control information may not be scrambled and allowed to be received by other receivers. In the above process, the control information may be scrambled more specifically, thus increasing the flexibility of sidelink communication.

In the embodiments of the present disclosure, in order to facilitate descrambling of the receiver, the sender may send the first identifier and the second identifier to the receiver through sidelink control information or a target channel, so that the receiver subsequently descrambles the received control information and service data, thus improving the transmission performance of the sidelink.

In the embodiments of the present disclosure, the receiver of the sidelink may obtain the control information and the service data by descrambling the scrambled control information and the scrambled service data respectively sent by the sender through the sidelink based on the first scrambling sequence and the second scrambling sequence. In the sidelink, the scrambled control information and the scrambled service data are descrambled at the receiver, thus improving the transmission performance of the sidelink.

It is understood that the above general descriptions and subsequent detailed descriptions are merely illustrative and explanatory rather than limiting of the present disclosure.

BRIEF DESCRIPTION OF THE DRAWINGS

The accompanying drawings, which are incorporated in and constitute a part of the present description, illustrate embodiments consistent with the present disclosure and serve to explain the principles of the present disclosure together with the description.

DETAILED DESCRIPTION

Figure 1:
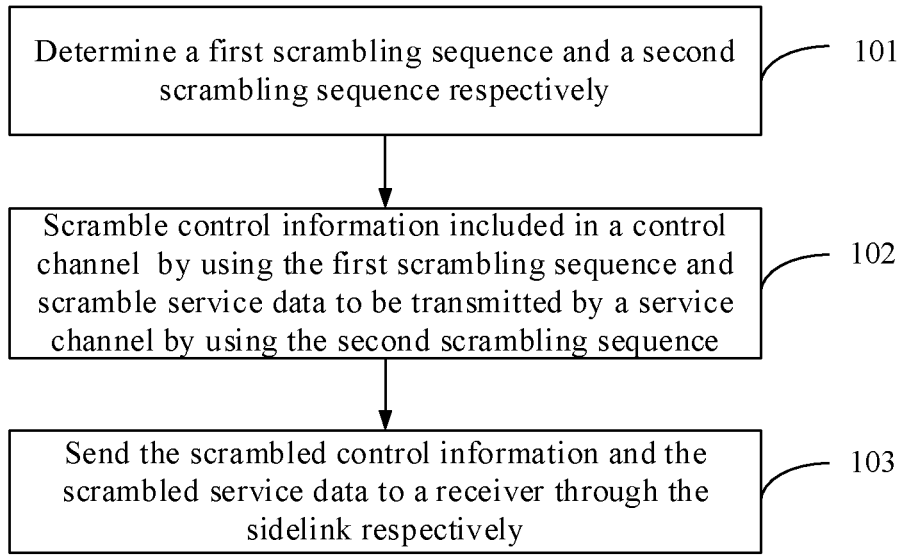
FIG. 1 is a flowchart illustrating a scrambling method according to an embodiment of the present disclosure.

Exemplary embodiments will be described in detail herein, with the illustrations thereof represented in the drawings. When the following descriptions involve the drawings, like numerals in different drawings, refer to like or similar elements unless otherwise indicated. The implementations described in the following exemplary embodiments do not represent all implementations consistent with the present application. Rather, they are merely examples of apparatuses and methods consistent with some aspects of the present application as described in detail in appended claims.

The term used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, the second information may also be referred as the first information. Depending on the context, the term "if" as used herein may be interpreted as "when" or "upon" or "in response to determining".

A scrambling method in the related art will be firstly introduced before descriptions are made to scrambling methods and descrambling methods according to the embodiments of the present disclosure.

A pseudo-random sequence has randomness of probabilities of 0 and 1 and the like and spectrum characteristic approximate to white noise, which helps to increase transmission performance. Normally, data sent by a sender is not necessarily a random sequence. In the related art, in order to randomize transmitted bits, modulo-2 addition is performed for one pseudo-random sequence and a bit sequence to be transmitted, thus randomizing the transmitted bits.

In an LTE system, in order to increase randomness of a sequence and ensure signal independence between different cells so as to achieve randomization of interference, a standard specifies that a scrambling code sequence may be determined according to a cell identifier, a timeslot number and a user identifier.

In an LTE system, the scrambling code sequence adopts 31-order Gold codes which are generated simply by performing modulo-2 addition for two M sequences. M sequence is abbreviated for a maximal length linear shift register sequence, which is a pseudo-random sequence, a pseudo-noise code or a pseudo-random code. The scrambling code sequence used in the LTE system is to be re-initialized at each sub-frame, and its initialization is dependent on a cell identifier, sub-frame number in radio frame, and a user identifier. In a case of double codeword transmission, scrambling code initialization of each codeword is also dependent on a codeword identifier.

Initialization manners of scrambling code sequences corresponding to different channels are as follows:

Physical Uplink Shared Channel (PUSCH):
$C_{int}=n_{RNTI} \cdot 2^{14}+\lfloor n_s/2 \rfloor \cdot 2^9+n_{ID}^{cell}$, where $n_{RNTI}$ is a user identifier, $n_s$ is a timeslot number, $n_{ID}^{cell}$ is a cell identifier; and a length value of a scrambling code sequence corresponding to PUSCH is a number of bits transmitted by PUSCH in one sub-frame;

Physical Uplink Control Channel (PUCCH):
$C_{int}=(\lfloor n_s/2 \rfloor+1) \cdot (2n_{ID}^{cell}+1) \cdot 2^{16}+n_{RNTI}$, where $n_{RNTI}$ is a user identifier, $n_s$ is a timeslot number, and $n_{ID}^{cell}$ is a cell identifier; and a length value of a scrambling code sequence corresponding to PUCCH is 20 bits;

Physical Downlink Shared Channel (PDSCH):
$C_{int}=n_{RNTI} \cdot 2^{14}+q \cdot 2^{13}+\lfloor n_s/2 \rfloor \cdot 2^9+n_{ID}^{cell}$ where $n_{RNTI}$ is a user identifier, $n_s$ is a timeslot number, $n_{ID}^{cell}$ is a cell identifier, q is a codeword identifier which is valued 0 or 1; and a length value of a scrambling code sequence corresponding to PDSCH is a number of bits transmitted by PDSCH in one sub-frame.

NR continues employing a generation manner of the scrambling code sequence of LTE but adjusts an initialization manner of the scrambling code sequence. Compared with the LTE system, the NR is to consider a more flexible service and scheduling manner and may face a more complex deployment and interference environment. Therefore, a data scrambling solution of the NR system is significantly different from the LTE system. Considering the NR supports a scheduling with less than one timeslot, i.e. is based on a non-timeslot scheduling manner, a start position of the scheduling may change very dynamically. If the specific position cannot be determined, scrambling and a series of subsequent operations cannot be performed for data in a cache. If the above-mentioned operations are performed after a time domain position is determined, a sending delay may be increased. Based on the above considerations, in order to reduce the sending delay as possible, a time domain parameter is not included in an initialization process of the scrambling sequence of the NR. To avoid impact of frequent switching on transmission quality, one configurable scrambling code initialization ID is adopted in the NR system in a case of signaling, so as to suppress interference between terminals. R specification (Release 15, version 15) defines the following scrambling code sequence initialization manner:

$C_{int}=n_{RNTI} \cdot 2^{15}+q \cdot +n_{ID}$. If there is no $n_{ID}$ configured at high layer, $n_{ID}=n_{ID}^{cell}$ is used by default where $n_{ID}^{cell}$ is a cell identifier, $n_{RNTI}$ is a user identifier, and q is a codeword identifier, which is valued 0 or 1.

Although a scrambling manner is available for LTE and NR in the related art, there is no sidelink scrambling method for NR-V2X.

Therefore, an embodiment of the present disclosure provides a scrambling method applicable to a sender of a sidelink. FIG. 1 is a flowchart illustrating a scrambling method according to an embodiment of the present disclosure. The method may include the following steps.

At step 101, a first scrambling sequence and a second scrambling sequence are determined respectively.

At step 102, control information included in a control channel is scrambled by using the first scrambling sequence and service data to be transmitted by a service channel is scrambled by using the second scrambling sequence.

At step 103, the scrambled control information and the scrambled service data are sent to a receiver through the sidelink respectively.

In the embodiments of the present disclosure, the sender of the sidelink may scramble the control information included in the control channel by using the first scrambling sequence and scramble, by using the second scrambling sequence, the service data to be transmitted by the service channel, and then send the scrambled control information and the scrambled service data to the receiver through the sidelink. In the embodiments of the present disclosure, the control information and the service data sent by the sender can be scrambled in the sidelink, thereby improving the transmission performance of the sidelink.

In the step 101, the sender may generate the first scrambling sequence and the second scrambling sequence based on a first identifier and a second identifier respectively.

In the embodiments of the present disclosure, in some examples, if there are a plurality of receivers, all of which are in the same multicast group, the sender may take at least one of a multicast identifier corresponding to the multicast group or a sender identifier as the first identifier. Further, the sender may take at least one of the multicast identifier or the sender identifier as the second identifier.

If there is only one receiver, that is, one-to-one sidelink communication is performed between the sender and the receiver; in some examples, if there are a plurality of receivers, all of which are not in the same multicast group, the sender is to perform broadcasting. At this time, the sender may take a preset value or the sender identifier as the first identifier. Correspondingly, the sender may directly take the sender identifier as the second identifier.

The preset value may be one unique group of bit values corresponding to the sender. In some examples, the preset value may be determined based on a region where the sender is located or manufacture defaults.

Furthermore, the sender may generate the first scrambling sequence $C_{int1}$ and the second scrambling sequence $C_{int2}$ based on the first identifier and the second identifier respectively in the following manner including but not limited to:

$C_{int1}=n_{ID}^{group} \cdot 2^{15}+n_{ID}$, or $C_{int1}=n_{ID}^{group}$, where $n_{ID}^{group}$ is a multicast identifier, and $n_{ID}$ is a sender identifier;

$C_{int1}=n_{ID}^{group} \times 2^{15}+n_{ID}$, where $n_{ID}^{group}$ is a multicast identifier, and $n_{ID}$ is a sender identifier.

In the above embodiment, the sender identifier may be a radio network temporary identifier (RNTI), or another identifier capable of identifying the sender.

In the step 102, after determining the first scrambling sequence and the second scrambling sequence, the sender may scramble the control information included in the control channel by using the first scrambling sequence and scramble, by using the second scrambling sequence, the service data to be transmitted by the service channel.

In some examples, the sender may perform scrambling by performing modulo-2 addition for a scrambling sequence and a to-be-sent bit sequence.

In the step 103, the sender may perform a series of subsequent processes for the scrambled control information and the scrambled service data through a sidelink pre-established with the receiver and then send them to the receiver. In the embodiments of the present disclosure, subsequent processes may include coding, modulation and the like.

In an embodiment, when the control information included in the control channel is scrambled by using the first scrambling sequence in the step 102, only target control information may be optionally scrambled by using the first scrambling sequence. The target control information is the control information only to be sent to the receiver.

In the embodiments of the present disclosure, only the control information to be sent to a current receiver is scrambled, and other control information is not to be scrambled and is allowed to be received by other receivers. In this way, the control information may be scrambled more specifically, thus increasing flexibility of sidelink communication.

Figure 2A:
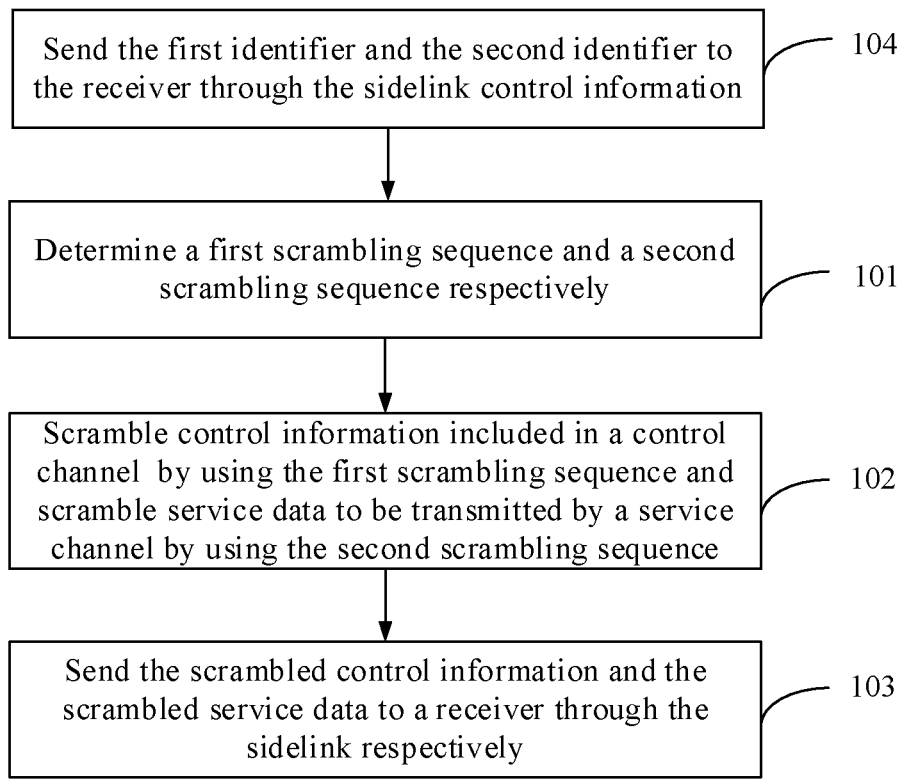
FIG. 2A and FIG. 2B are flowcharts illustrating scrambling methods according to embodiments of the present disclosure.

In an embodiment, FIG. 2A is a flowchart illustrating another scrambling method according to the embodiment of FIG. 1. The method further includes the following step.

At step 104, the first identifier and the second identifier are sent to the receiver through the sidelink control information.

In the embodiments of the present disclosure, the sender may send the first identifier and the second identifier to the receiver through sidelink control information (SCI) during a process of establishing a sidelink with the receiver, thus facilitating subsequent descrambling of the receiver.

Figure 2B:
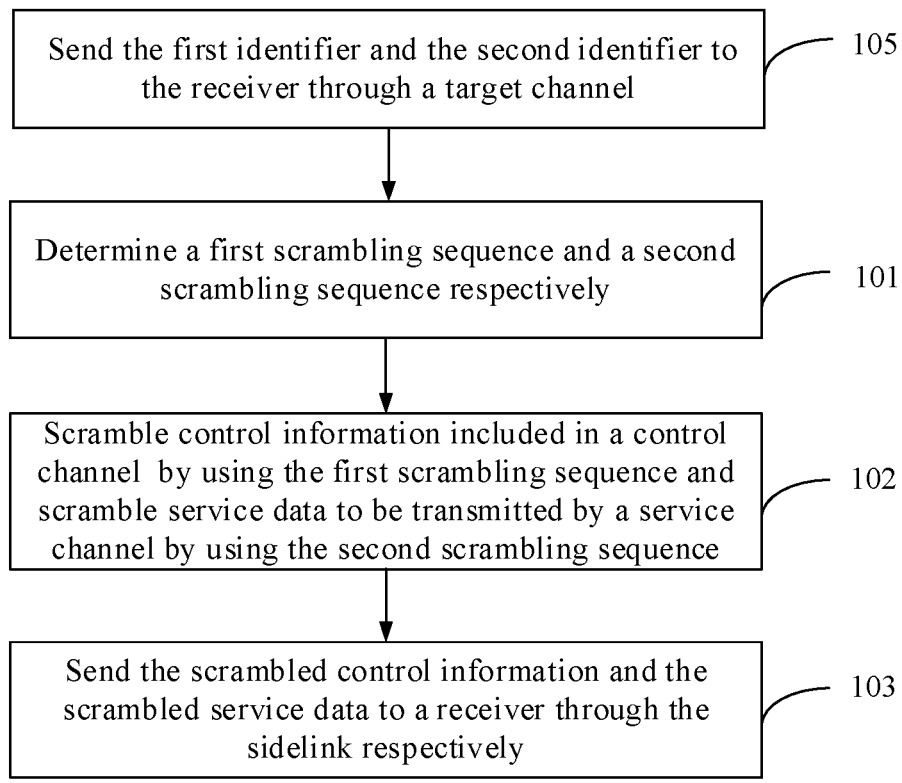

In an embodiment, FIG. 2B is a flowchart illustrating another scrambling method according to the embodiment of FIG. 1. The method further includes the following step.

At step 105, the first identifier and the second identifier are sent to the receiver through a target channel.

In the embodiments of the present disclosure, in some examples, the target channel may be a broadcast channel, for example, a Packet Broadcast Control Channel (PBCCH), or the target channel may be a synchronization channel which is a channel to assist a user in performing synchronous capture. The synchronization channel is generally one segment of sequence with strong autocorrelation, or a channel located in a fixed position and carrying synchronization information.

In the step 105, the sender may send the first identifier and the second identifier to the receiver through the control channel to facilitate subsequent descrambling of the receiver.

In an embodiment, in some examples, a length value of the first scrambling sequence and a length value of the to-be-scrambled control information included in the control channel may be controlled to be equal, for example, the length value of the control information is M bits, and the length value of the first scrambling sequence is also M bits.

A length value of the second scrambling sequence may be equal to a length value of the service data to be transmitted by the service channel.

In the above embodiment, the control information and the service data to be sent can be scrambled at the sender through the sidelink while the resources occupied by the scrambling sequences are reduced.

Figure 3:
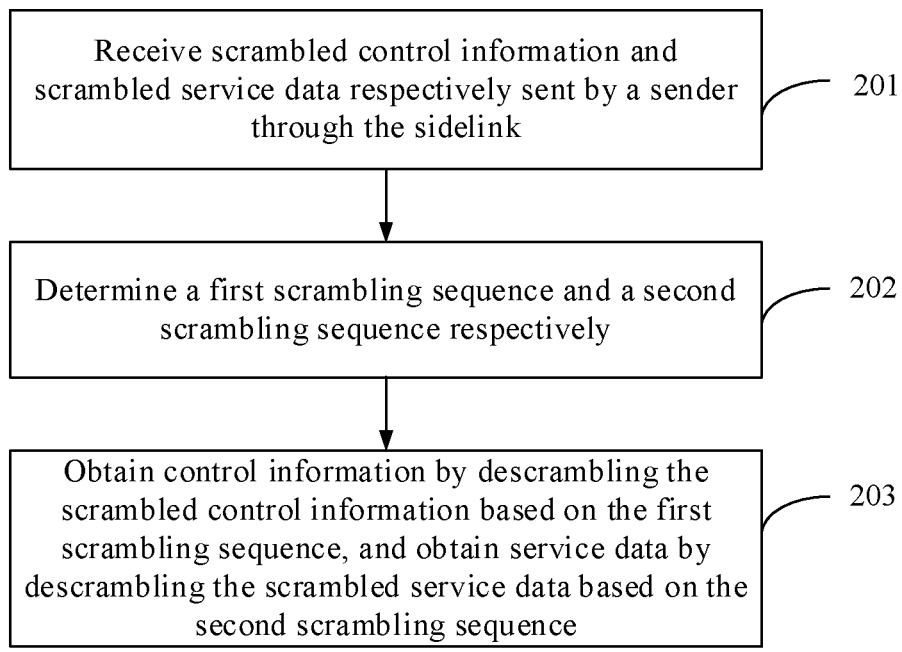
FIG. 3 is a flowchart illustrating a descrambling method according to an embodiment of the present disclosure.

For the above scrambling method, an embodiment of the present disclosure further provides a descrambling method applicable to a receiver of a sidelink. FIG. 3 is a flowchart illustrating a descrambling method according to an embodiment of the present disclosure. The method may include the following steps.

At step 201, scrambled control information and scrambled service data respectively sent by a sender through the sidelink are received.

At step 202, a first scrambling sequence and a second scrambling sequence are determined respectively.

At step 203, control information is obtained by descrambling the scrambled control information based on the first scrambling sequence, and service data is obtained by descrambling the scrambled service data based on the second scrambling sequence.

In the above embodiment, the receiver of the sidelink may obtain the control information and the service data by descrambling the scrambled control information and the scrambled service data respectively sent by the sender through the sidelink based on the first scrambling sequence and the second scrambling sequence respectively. Thus, the scrambled control information and the scrambled service data can be descrambled at the receiver in the sidelink, thereby improving the transmission performance of the sidelink.

In the step 201, the receiver may directly receive, through the sidelink pre-established with the sender, the control information and the service data which are scrambled by the sender.

In the step 202, the receiver may determine the first scrambling sequence and the second scrambling sequence based on previously-received first identifier and second identifier respectively.

In some examples, the sender may send the first identifier and the second identifier to the receiver through SCI or a target channel, and the receiver may receive them directly.

Furthermore, the manner in which the receiver determines the first scrambling sequence and the second scrambling sequence respectively is same as the manner in which the sender determines the first scrambling sequence and the second scrambling sequence and thus will not be repeated herein.

In the step 203, after determining the first scrambling sequence, the receiver may obtain the control information by descrambling the scrambled control information based on the first scrambling sequence, where the control information herein may be all control information sent by the sender or target control information only to be sent to the receiver.

Furthermore, after determining the second scrambling sequence, the receiver may also obtain the service data by descrambling the scrambled service data based on the second scrambling sequence.

Figure 4:
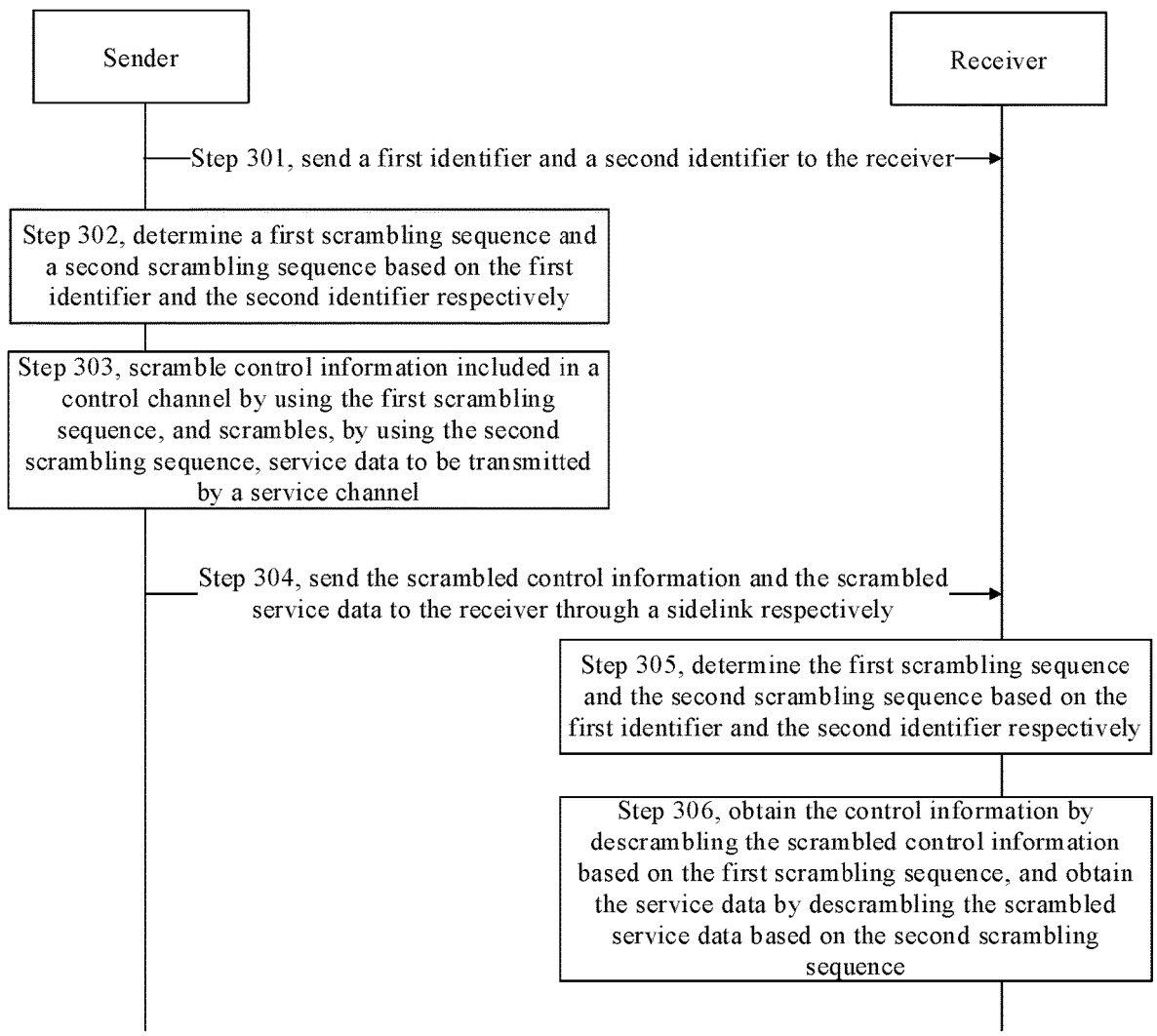
FIG. 4 is a flowchart illustrating a scrambling and descrambling method according to an embodiment of the present disclosure.

In an embodiment, FIG. 4 is a flowchart illustrating a scrambling and descrambling method according to an embodiment of the present disclosure, which includes the following steps.

At step 301, a sender sends a first identifier and a second identifier to a receiver.

In some examples, the sender may send the first identifier and the second identifier to the receiver through SCI or a target channel.

At step 302, the sender determines a first scrambling sequence and a second scrambling sequence based on the first identifier and the second identifier respectively.

At step 303, the sender scrambles control information included in a control channel by using the first scrambling sequence, and scrambles, by using the second scrambling sequence, service data to be transmitted by a service channel.

In some examples, the sender may scramble target control information by using the first scrambling sequence, where the target control information is the control information only to be sent to the receiver.

At step 304, the scrambled control information and the scrambled service data are sent to the receiver through a sidelink respectively.

At step 305, the receiver determines the first scrambling sequence and the second scrambling sequence based on the first identifier and the second identifier respectively.

At step 306, the receiver obtains the control information by descrambling the scrambled control information based on the first scrambling sequence, and obtains the service data by descrambling the scrambled service data based on the second scrambling sequence.

In the above embodiment, the control information and the service data sent by the sender are scrambled in the sidelink, and the scrambled control information and the scrambled service data are descrambled at the receiver, thus improving the transmission performance of the sidelink.

Corresponding to the above method embodiments for implementing the application functions, the present disclosure further provides an embodiment of an apparatus for implementing an application function and corresponding sender and receiver.

Figure 5:
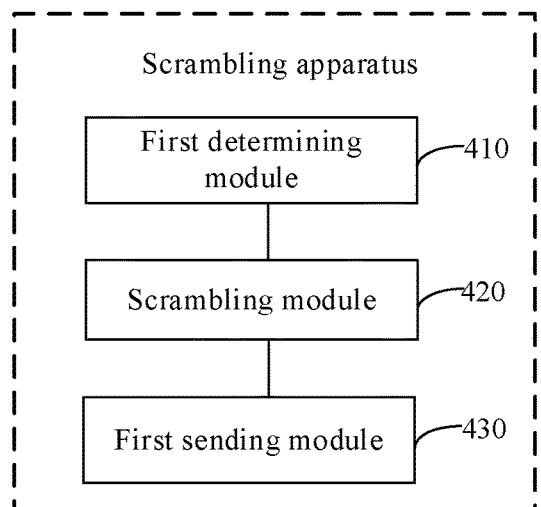
FIG. 5 is a block diagram illustrating a scrambling apparatus according to an embodiment of the present disclosure.

FIG. 5 is a block diagram illustrating a scrambling apparatus according to an embodiment of the present disclosure. The apparatus is applied to a sender of a sidelink and includes:

a first determining module 410, configured to determine a first scrambling sequence and a second scrambling sequence respectively;

a scrambling module 420, configured to scramble control information included in a control channel by using the first scrambling sequence and scramble, by using the second scrambling sequence, service data to be transmitted by a service channel; and a first sending module 430, configured to send the scrambled control information and the scrambled service data to a receiver through the sidelink respectively.

Figure 6:
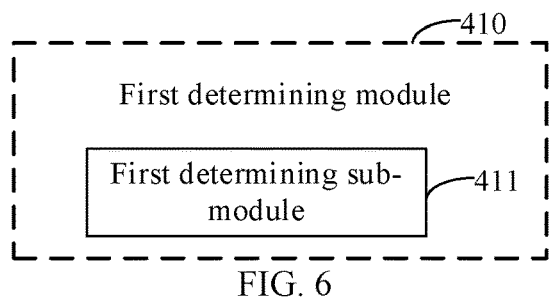
FIG. 6 is a block diagram illustrating another scrambling apparatus according to an embodiment of the present disclosure.

FIG. 6 is a block diagram illustrating another scrambling apparatus based on the embodiment of FIG. 5. The first determining module 410 includes:

a first determining sub-module 411, configured to determine the first scrambling sequence based on a first identifier and determine the second scrambling sequence based on a second identifier.

In some examples, if there are a plurality of receivers, all of which are in the same multicast group, the first identifier is at least one of a multicast identifier corresponding to the multicast group or a sender identifier, and the second identifier is at least one of the multicast identifier or the sender identifier.

In some examples, if there are one or more receivers, all of which are not in the same multicast group, the first identifier is a preset value or the sender identifier, and the second identifier is the sender identifier.

Figure 7:
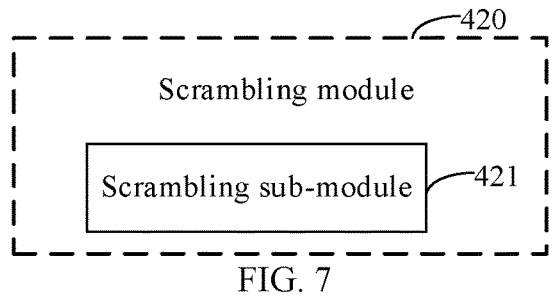
FIG. 7 is a block diagram illustrating another scrambling apparatus according to an embodiment of the present disclosure.

FIG. 7 is a block diagram illustrating another scrambling apparatus based on the embodiment of FIG. 5. The scrambling module 420 includes:

a scrambling sub-module 421, configured to scramble target control information by using the first scrambling sequence, where the target control information is the control information only to be sent to the receiver.

Figure 8:
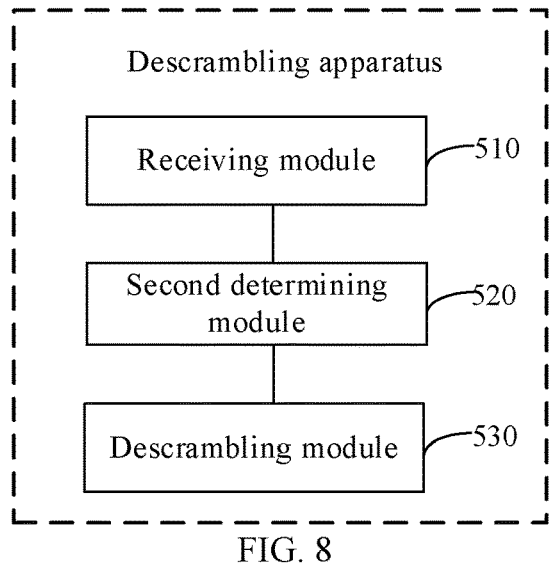
FIG. 8 is a block diagram illustrating a descrambling apparatus according to an embodiment of the present disclosure.

FIG. 8 is a block diagram illustrating a descrambling apparatus according to an embodiment of the present disclosure. The apparatus is applied to a receiver of a sidelink and includes:

a receiving module 510, configured to receive scrambled control information and scrambled service data respectively sent by a sender through the sidelink;

a second determining module 520, configured to determine a first scrambling sequence and a second scrambling sequence respectively; and a descrambling module 530, configured to obtain control information by descrambling the scrambled control information based on the first scrambling sequence, and obtain service data by descrambling the scrambled service data based on the second scrambling sequence.

Figure 9:
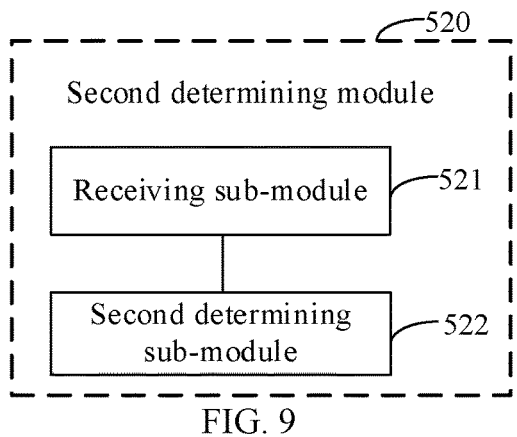
FIG. 9 is a block diagram illustrating another descrambling apparatus according to an embodiment of the present disclosure.

FIG. 9 is a block diagram illustrating another descrambling apparatus based on the embodiment of FIG. 8. The second determining module 520 includes:

a receiving sub-module 521, configured to receive a first identifier and a second identifier from the sender; and a second determining sub-module 522, configured to determine the first scrambling sequence based on the first identifier and determine the second scrambling sequence based on the second identifier.

Since the apparatus embodiments substantially correspond to the method embodiments, a reference may be made to part of the descriptions of the method embodiments for the related part. The apparatus embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

Correspondingly, the present disclosure further provides a computer readable storage medium storing computer program. The computer programs are executed to implement any one of the above scrambling methods applied to the sender of the sidelink.

Correspondingly, the present disclosure further provides a computer readable storage medium storing computer program. The computer programs are executed to implement any one of the above descrambling methods applied to the receiver of the sidelink.

Correspondingly, the present disclosure further provides a scrambling apparatus, which is applied to a sender of a sidelink and includes:

a processor; and a memory for storing instructions executable by the processor;

where the processor is configured to:

determine a first scrambling sequence and a second scrambling sequence respectively;

scramble control information included in a control channel by using the first scrambling sequence, and scramble, by using the second scrambling sequence, service data to be transmitted by a service channel; and send the scrambled control information and the scrambled service data to a receiver through the sidelink respectively.

Figure 10:
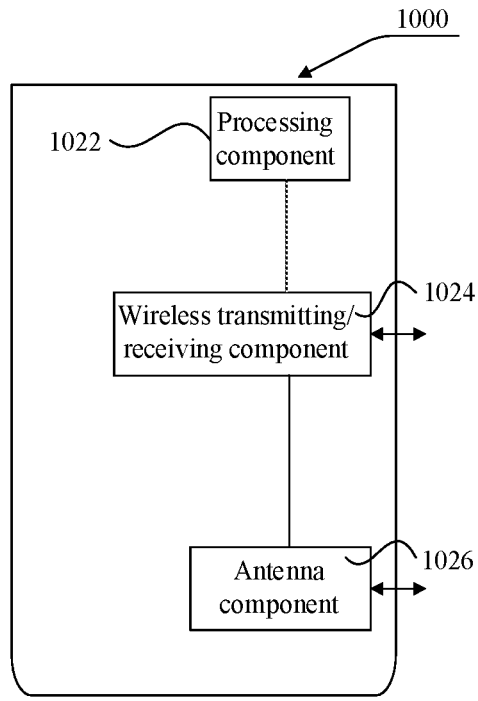
FIG. 10 is a schematic structural diagram illustrating a scrambling apparatus according to an embodiment of the present disclosure.

FIG. 10 is a schematic structural diagram illustrating a scrambling apparatus 1000 according to an embodiment of the present disclosure. The apparatus 1000 may be provided as a sender of a sidelink. With reference to FIG. 10, the apparatus 1000 includes a processing component 1022, a radio transmission/receiving component 1024, an antenna component 1026, and a signal processing part specific to a radio interface. The processing component 1022 may further include one or more processors.

One processor in the processing component 1022 may be configured to perform any one of the above scrambling methods.

Correspondingly, the present disclosure further provides a descrambling apparatus, which is applied to a receiver of a sidelink and includes:

a processor; and a memory for storing instructions executable by the processor;

where the processor is configured to:

receive scrambled control information and scrambled service data respectively sent by a sender through the sidelink;

determine a first scrambling sequence and a second scrambling sequence respectively; and obtain control information by descrambling the scrambled control information based on the first scrambling sequence, and obtain service data by descrambling the scrambled service data based on the second scrambling sequence.

Figure 11:
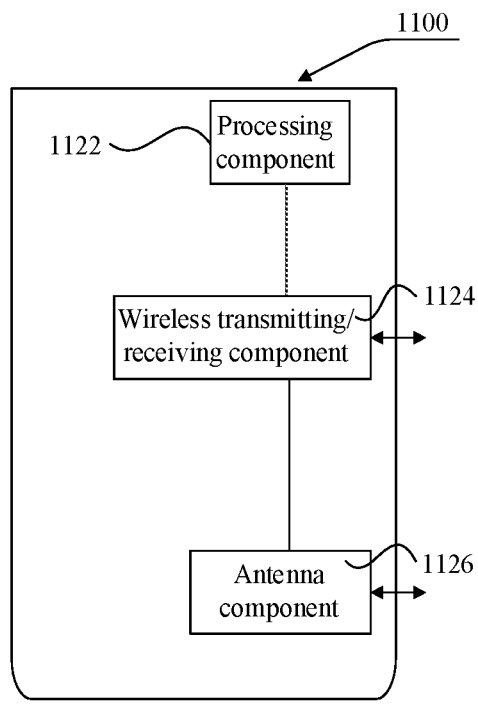
FIG. 11 is a schematic structural diagram illustrating a descrambling apparatus according to an embodiment of the present disclosure.

FIG. 11 is a schematic structural diagram illustrating a descrambling apparatus 1100 according to an embodiment of the present disclosure. The apparatus 1100 may be provided as a receiver of a sidelink. With reference to FIG. 11, the apparatus 1100 includes a processing component 1122, a radio transmission/receiving component 1124, an antenna component 1126, and a signal processing part specific to a radio interface. The processing component 1122 may further include one or more processors.

One processor in the processing component 1122 may be configured to perform any one of the above descrambling methods.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as exemplary only, with a true scope and spirit of the present disclosure indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A scrambling method, comprising:

determining, with a sender of a sidelink, a first scrambling sequence and a second scrambling sequence respectively;

scrambling, with the sender of the sidelink, control information comprised in a control channel by using the first scrambling sequence, and scrambling, by using the second scrambling sequence, service data to be transmitted by a service channel; and sending, with the sender of the sidelink, the scrambled control information and the scrambled service data to a receiver through the sidelink;

wherein said determining the first scrambling sequence and the second scrambling sequence resp ctively comprises:

determining the first scrambling sequence based on a first identifier, and determining the second scrambling sequence based on a second identifier;

if there are a plurality of receivers, all of which are in the same multicast group. the first identifier is at least one of a multicast identifier corresponding to the multicast group or a send or identifier, and the second identifier is at least one of the multicast identifier or the sender identifier:
if there are one or more receivers, all of which are not in the same multicast group, the first identifier is a preset value or a sender identifier, and the second identifier is the sender identifier.

2. The method of claim 1, wherein said scrambling the control information comprised in the control channel by using the first scrambling sequence comprises:
scrambling target control information by using the first scrambling sequence, wherein the target control information is the control information only to be sent to the receiver.

3. A descrambling method, comprising:
receiving, with a receiver of a sidelink, scrambled control information and scrambled service data respectively sent by a sender through the sidelink;
determining, with the receiver of the side link, a first scrambling sequence and a second scrambling sequence respectively; and
obtaining, with the receiver of the side link, control information by descrambling the scrambled control information based on the first scrambling sequence and obtaining service data by descrambling the scrambled service data based on the second scrambling sequence;
wherein said determining the first scrambling sequence and the second scrambling sequence respectively comprises:
receiving a first identifier and a second identifier from the sender; and
determining the first scrambling sequence based on the first identifier and determining the second scrambling sequence based on the second identifier;
if there are a plurality of receivers, all of which are not in the same multicast group, the first identifier is at least one of a multicast identifier corresponding to the multicast group or a sender identifier, and the second identifier is at least one of the multicast identifier or the sender identifier;
if there are one or more receivers, all of which are not in the same multicast group, the first identifier is a preset value or a sender identifier, and the second identifier is the sender identifier.

4. A scrambling apparatus, being applied to a sender of a sidelink and comprising:
one or more processors; and
a non-transitory computer-readable storage medium for storing instructions executable by the one or more processors;
wherein the one or more processors are configured to:
determine a first scrambling sequence and a second scrambling sequence respectively;
scramble control information comprised in a control channel by using the first scrambling sequence, and scramble, by using the second scrambling sequence, service data to be transmitted by a service channel; and
send the scrambled control information and the scrambled service data to a receiver through the sidelink respectively;
wherein when determining the first scrambling sequence and the second scrambling sequence respectively, the one or more processors are configured to:

determine the first scrambling sequence based on a first identifier, and determine ond scrambling sequence on a second identifier;
if there are a plurality of receivers, all of which are in the same multicast group, the first identifier is at least one of a multicast idenfier corresponding to the multicast group or a sender identifier, and the second identifier is at least one of the multicast identifier or the sender identifier;
if there are one or more receivers, all of which are not in the same multicast group, the first identifier is a preset value or a sender identifier, and the second identifier is the sender identifier.

5. A descrambling apparatus implementing the method according to claim 3, comprising:
one or more processors; and
a non-transitory computer-readable storage medium for storing instructions executable by the one or more processors;
wherein the one or more processors are configured to:
receive scrambled control information and scrambled service data respectively sent by a sender through the sidelink;
determine a first rambling sequence and a second scrambling sequence respectively; and
obtain control information by descrambling the scrambled control information based on the first scrambling sequence, and obtain service data by descrambling the scrambled service data based on the second scrambling sequence;
wherein when determining the first scrambling sequence and the second scrambling sequence respectively, the one or more processors are configured to:
receive a first identifier and a second identifier from the sender; and
determine the first scrambling sequence based on the first identifier and determine the second scrambling sequence based on the second identifier;
if there are a plurality of receivers, all of which are in the same multicast group, the first identifier is at least one of a multicast identifier corresponding to the multicast group or a sender identifier, and the second identifier is at least one of the multicast identifier or the sender identifier;
if there are one or more receivers, all of which are not in the same multicast group, the first identifier is a preset value or a sender identifier and the second dentifier is the sender identifier.

6. The apparatus of claim 4, wherein when scrambling the control information comprised in the control channel by using the first scrambling sequence, the one or more processors are configured to:
scramble target control information by using the first scrambling sequence, wherein the target control information is the control information only to be sent to the receiver.

7. A communication system implementing the method according to claim 1, comprising a scrambling apparatus including the sender of the sidelink, wherein the control information and the service data sent by the sender are scrambled in the sidelink to thereby improve transmission performance of the sidelink.

8. The communication system of claim 7, wherein the first scrambling sequence and the second scrambling sequence are generated correspondingly based on a first identifier and a second identifier to thereby improve availability of the side link.

9. The communication system of claim 8, wherein:
the sender is configured to scramble only the target control information by using the first scrambling sequence; and
the target control information is control information only to be sent to a current receiver.

10. The communication system of claim 9, wherein:
control information other than the target control information is not scrambled and allowed to be received by other receivers, to thereby increase flexibility of sidelink communication.

11. The communication system of claim 10, further comprising a descrambling apparatus including the receiver, wherein:
the sender is configured to send the first identifier and the second identifier to the receiver through sidelink control information or a target channel; and
the receiver is configured to subsequently descramble the received control information and service data, thereby improving the transmission performance of the sidelink.

12. The communication system of claim 11, wherein:
the receiver is configured to obtain the control information and the service data by descrambling the scrambled control information and the scrambled service data sent by the sender through the sidelink based on the first scrambling sequence and the second scrambling sequence.

* * * * *